United States Patent Office

3,654,285
Patented Apr. 4, 1972

3,654,285
PROCESS FOR THE MANUFACTURE OF β-PICOLINE
Enrico Catalucci, Visp, Switzerland, assignor to Lonza Ltd., Basel, Switzerland
No Drawing. Filed Jan. 2, 1970, Ser. No. 448
Claims priority, application Switzerland, Jan. 3, 1969, 4/69
Int. Cl. C07d 31/04
U.S. Cl. 260—290 P                    9 Claims

ABSTRACT OF THE DISCLOSURE

β-Picoline is produced in high yield by reacting a 1,1,3-trialkoxypropane with an excess of ammonia at high temperature in a liquid aqueous phase without the need for any catalyst.

BACKGROUND OF THE INVENTION

Field of the invention

The invention relates to the preparation of β-picoline.

The prior art

There are known methods for manufacturing β-picoline by condensing aliphatic aldehydes or mixtures thereof (acrolein, acrolein and propanal, acetaldehyde and formaldehyde, for example) with excess ammonia in the gaseous phase at temperatures ranging from 350 to 500° C. in the presence of dehydrating catalyzers. In such known processes, the β-picoline yields rarely exceed 40% of the theoretical values. One considerable disadvantage inherent in these methods is that due to carbon deposits, the catalyst activity disappears after a few hours.

Moreover, experiments have shown that if the above starting materials are made to react with ammonia in liquid phase and in the absence of water, without catalysts, only slight quantities of β-picoline (16% of the theoretical value at the most) are obtained, this being due to secondary polymerization reactions.

The object of the present invention is to reduce such secondary reactions under the said condition to a minimum.

SUMMARY OF THE INVENTION

β-Picoline is produced in high yield by reacting organic oxygen containing compounds with excess ammonia at high temperature in the liquid, aqueous phase, without any catalyst. The organic oxygen containing compounds are 1,1,3-trialkoxypropanes. The alkoxy groups of the said compounds are those containing 1 to 4 carbon atoms.

DETAILED DESCRIPTION

This invention relates to a process for the manufacture of β-picoline, starting with an organic oxygen-containing compound and excess ammonia at high temperatures in the liquid, aqueous phase without catalysts.

According to the invention, the process is accomplished by using a 1,1,3-trialkoxypropane as the starting organic oxygen-containing material.

The preferred trialkoxypropanes are those whose alkoxy groups contain 1 to 4 carbon atoms.

The process according to the invention yields up to 35 to 45% of the theoretical yield. It is believed that the first stage of the reaction is an acrolein dehydration, followed by the further transformation by ammonia into β-picoline. The pronounced increase in yield by the present process appears to be explainable from the fact that the acrolein concentration at any given instant is so slight that its polymerization is considerably diminished.

The process according to the invention is conducted at a temperature in the range of 200 to 400° C., preferably between 220 and 300° C.; while the duration of the reaction can vary between 3 and 6 hours.

4 to 40 (preferably 15 to 30) mols of water and 3 to 20 mols of ammonia are preferably used per mol of 1,1,3-trialkoxypropane.

In the following examples, the reactions were performed in an electrically heated rust-proof steel oscillating autoclave of 54 fl. oz. capacity. After cooling, the product of the reaction was extracted in ether, the ether was then evaporated and the residue was distilled. The 80–180° C./760 mm. Hg fraction was subjected to analysis by gas chromatography. The 1,1,3-trialkoxypropanes used as starting materials are readily available, for example, from acrolein and equivalent aliphatic alcohols.

Example 1.—134.1 g. of 1,1,3-trimethoxypropane (1 mol) were mixed with 680 g. of 25% ammonia in the autoclave and left to react under 130 atmospheres pressure at 280° C. for 3 hours. After cooling, the reaction product was extracted with ether and the ether was driven off. The residue was distilled at normal pressure. The 80–180° C. fraction, analyzed by pyridine content, contained 19.1 g. β-picoline (41% yield based on the original trimethoxypropane input). The trimethoxypropane exchange amounted to more than 99%.

Small quantities of pyridine, 3,5-lutidine, 2,5-lutidine and 3-ethyl pyridine were present as by-products.

Example 2.—134.1 g. of 1,1,3-trimethoxypropane (1 mol) were mixed with 680 g. of 25% ammonia in the autoclave and left to react under 60 atmospheres pressure at 220° C. for 6 hours. The reaction products were treated as in Example 1. The β-picoline yield was 45% (based on original trimethoxypropane input); the trimethoxypropane exchange was 97.5%.

Example 3.—109 g. of 1,1,3-triisopropoxypropane (0.5 mol) were mixed with 510 g. of 25% ammonia in the autoclave and left to react under 100 atmospheres pressure at 260° C. for 3 hours. The reaction products were treated as in Example 1. The β-picoline yield was 40.5% (based on original triisopropoxypropane input); the triisopropoxypropane exchange exceeded 99%.

In the following examples Nos. 4 to 8 various $NH_3$: propane mol ratios are employed when using various alkoxypropane compounds.

Example 4.—86.7 g. of 1,1,3-triisobutoxypropane (0.33 mol) were left to react with 113.3 g. of 25% ammonia under 80 atmospheres pressure at 265° C. for 3 hours in an electrically heated, rustless steel churn autoclave of 13.5 fl. oz. capacity. The reaction products were treated as in Example 1. The β-picoline yield was 35% (based on original triisobutoxypropane input).

Example 5.—130 g. of 1,1,3-triisobutoxypropane (0.5 mol) were left to react with 510 g. of 25% ammonia under 102 atmospheres pressure at 265° C. for 3 hours in an electrically heated, rustless steel churn autoclave of 54 fl. oz. capacity. The reaction products were treated as in Example 1. The β-picoline yield was 39% (based on original triisobutoxypropane input).

Example 6.—130 g. of 1,1,3-tri-n-butoxypropane (0.5 mol) as in Example 5 were left to react with 510 g. 25% ammonia under 95 atmospheres pressure at 260° C. The reaction products were treated as in example. The β-picoline yield was 43% (based on original tri-n-butoxypropane input).

Example 7.—86.7 g. of 1,1,3-tri-n-butoxypropane (0.33 mol) as in Example 4 were left to react with 113.3 g. 25% ammonia under 89 atmospheres pressure at 263° C. The β-picoline yield was 35% (based on original tri-n-butoxypropane input).

Example 8.—109 g. of 1,1,3-tri-n-propoxypropane (0.5 mol) as in Example 5 were left to react with 510 g. of 25% ammonia under 98 atmospheres pressure at 260° C. The β-picoline yield was 38% (based on original tri-n-propoxypropane input).

The following Examples 9 and 10 concern the reaction with trimethoxypropane, using still larger excesses of ammonia and/or water.

Example 9.—In a 13.5 fl. oz. autoclave cooled down to −40° C., 33.5 g. of 1,1,3-trimethoxypropane (0.25 mol) were added to 112.5 g. of water (6.25 mol). After a certain length of time 76.5 g. of liquid ammonia (4.5 mol) were also added. The autoclave was closed, and the mixture heated under vibration for 3 hours at 260° C. and 125 atmospheres. The reaction products were treated as in Example 1. The β-picoline yield was 43% (based on original 1,1,3-trimethoxypropane input).

Example 10.—33.5 g. of 1,1,3-trimethoxypropane (0.25 mol) as in Example 9 were left to react with 49 g. of liquid ammonia (2.88 mol) and 144 g. of water (8 mol) at 264° C. under 98 atmospheres pressure. The β-picoline yield was 35% (based on original 1,1,3-trimethoxypropane input).

What is claimed is:

1. A non-catalytic process for producing β-picoline which comprises reacting a 1,1,3-trialkoxypropane with excess ammonia at a temperature of 200–400° C. in a liquid, aqueous phase.

2. A process as claimed in claim 1 wherein the temperature is 220°–300° C.

3. A process as claimed in claim 1 wherein the molar ratio of water to 1,1,3-trialkoxypropane in the aqueous phase is 4–40:1.

4. A process as claimed in claim 4 wherein the molar ratio is 15–30:1.

5. A process as claimed in claim 1 wherein the molar ratio of ammonia to 1,1,3-trialkoxypropane is 3–20:1.

6. A process as claimed in claim 1 wherein the alkoxy group of the 1,1,3-trialkoxypropane is a $C_1$ to $C_4$ alkoxy group.

7. A process as claimed in claim 1 wherein the ammonia is used in the form of an aqueous solution of ammonia.

8. A process as claimed in claim 1 wherein the ammonia is used in the form of liquid ammonia.

9. A process as claimed in claim 1 wherein the reaction is effected at a pressure of at least 60 atm.

References Cited
UNITED STATES PATENTS 2,740,789   4/1956   MacLean _____ 260—290

HENRY R. JILES, Primary Examiner

H. I. MOATZ, Assistant Examiner